(12) United States Patent
Chen et al.

(10) Patent No.: US 9,799,228 B2
(45) Date of Patent: Oct. 24, 2017

(54) SYSTEMS AND METHODS FOR NATURAL LANGUAGE PROCESSING FOR SPEECH CONTENT SCORING

(71) Applicant: Educational Testing Service, Princeton, NJ (US)

(72) Inventors: Lei Chen, Pennington, NJ (US); Klaus Zechner, Princeton, NJ (US); Anastassia Loukina, Princeton, NJ (US)

(73) Assignee: Educational Testing Service, Princeton, NJ (US)

(*) Notice: Subject to any disclaimer, the term of this patent is extended or adjusted under 35 U.S.C. 154(b) by 615 days.

(21) Appl. No.: 14/152,178

(22) Filed: Jan. 10, 2014

(65) Prior Publication Data

US 2014/0199676 A1    Jul. 17, 2014

Related U.S. Application Data

(60) Provisional application No. 61/751,300, filed on Jan. 11, 2013.

(51) Int. Cl.
| | | |
|---|---|---|
| *G09B 7/02* | (2006.01) | |
| *G10L 15/01* | (2013.01) | |
| *G10L 15/06* | (2013.01) | |

(52) U.S. Cl.
CPC ............... *G09B 7/02* (2013.01); *G10L 15/01* (2013.01); *G10L 15/063* (2013.01)

(58) Field of Classification Search
CPC ... G09B 7/02; G09B 5/00; G09B 7/00; G09B 19/06; G10L 15/1822; G10L 15/00;
(Continued)

(56) References Cited

U.S. PATENT DOCUMENTS 7,392,187 B2 * 6/2008 Bejar .................... G10L 15/063
                                                    704/243
7,440,895 B1 * 10/2008 Miller .................... G10L 15/01
                                                    704/231
(Continued)

OTHER PUBLICATIONS

Breck, Eric, Burger, John, Ferro, Lisa, Hirschman, Lynette, House, David, Light, Marc, Mani, Inderjeet; How to Evaluate Your Question Answering System Every Day . . . and Still Get Real Work Done; International Conference on Language Resources and Evaluation; 2000.
(Continued)

*Primary Examiner* — Eddy Saint-Vil
(74) *Attorney, Agent, or Firm* — Jones Day (57) ABSTRACT

Computer-implemented systems and methods are provided for scoring content of a spoken response to a prompt. A scoring model is generated for a prompt, where generating the scoring model includes generating a transcript for each of a plurality of training responses to the prompt, dividing the plurality of training responses into clusters based on the transcripts of the training responses, selecting a subset of the training responses in each cluster for scoring, scoring the selected subset of training responses for each cluster, and generating content training vectors using the transcripts from the scored subset. A transcript is generated for a received spoken response to be scored, and a similarity metric is computed between the transcript of the spoken response to be scored and the content training vectors. A score is assigned to the spoken response based on the determined similarity metric.

24 Claims, 9 Drawing Sheets

(58) Field of Classification Search
CPC ....... G10L 15/08; G10L 15/18; G10L 15/063; G10L 15/01
USPC ................ 434/350, 362, 353, 156; 715/738; 704/235, 353, 243, 256.1
See application file for complete search history.

(56) References Cited

U.S. PATENT DOCUMENTS

| | | | | |
|---|---|---|---|---|
| 2007/0269788 | A1* | 11/2007 | Flowers | G09B 7/00 434/350 |
| 2008/0033720 | A1* | 2/2008 | Kankar | G10L 15/1822 704/235 |
| 2010/0145698 | A1* | 6/2010 | Chen | G09B 7/02 704/256.1 |
| 2011/0270612 | A1* | 11/2011 | Yoon | G09B 19/06 704/251 |
| 2013/0004931 | A1* | 1/2013 | Attali | G09B 19/06 434/353 |

OTHER PUBLICATIONS

Furui, Sadaoki; Recent Advances in Automatic Speech Summarization; IEEE, Workshop on Spoken Language Technology; Dec. 2006.

Liu, Feifan, Liu, Yang; Correlation Between ROUGE and Human Evaluation of Extractive Meeting Summaries; Proceedings of the 46th Annual Meeting of the Association for Computational Linguistics on Human Language Technologies: Short Papers; pp. 201-204; 2008.

Magnini, Bernardo, Negri, Matteo, Prevete, Roberto, Tanev, Hristo; Is It the Right Answer?: Exploiting Web Redundancy for Answer Validation; Proceedings of the 40th Annual Meeting of the Association for Computational Linguistics; pp. 425-432; 2002.

Turney, Peter; Mining the Web for Synonyms: PMI-IR Versus LSA on TOEFL; Proceedings of the 12th European Conference on Machine Learning; pp. 491-502; 2001.

* cited by examiner

SYSTEMS AND METHODS FOR NATURAL LANGUAGE PROCESSING FOR SPEECH CONTENT SCORING

This application claims priority to U.S. Provisional Application No. 61/751,300 filed on Jan. 11, 2013, entitled "Applying Several NLP Methodologies (Unsupervised Learning, Document Clustering, Answer Validation, and Automated Summarization Evaluation on Speech Content Scoring," the entirety of which is herein incorporated by reference.

FIELD

The technology described herein relates generally to spoken language testing and more specifically to content scoring of spoken responses.

BACKGROUND

It is often desirable to measure a person's ability to verbally communicate. Scoring of a person's speaking ability can consider one or both of the speaker's mechanical speaking ability (e.g., pronunciation, prosody, fluency) and content. Typically, verbal communication abilities have been measured through human, manual scoring of spoken responses to prompts, where one or more scorers provides feedback as to the quality of the spoken responses. Manual scoring is often cost and resource expensive, especially in contexts where large numbers of spoken responses must be scored.

SUMMARY

In accordance with the teachings herein, computer-implemented systems and methods are provided for scoring content of a spoken response to a prompt. A scoring model is generated for a prompt, where generating the scoring model includes generating a transcript for each of a plurality of training responses to the prompt, dividing the plurality of training responses into clusters based on the transcripts of the training responses, selecting a subset of the training responses in each cluster for scoring, scoring the selected subset of training responses for each cluster, and generating content training vectors using the transcripts from the scored subset. A transcript is generated for a received spoken response to be scored, and a similarity metric is computed between the transcript of the spoken response to be scored and the content training vectors. A score is assigned to the spoken response based on the determined similarity metric.

DETAILED DESCRIPTION

Figure 1:
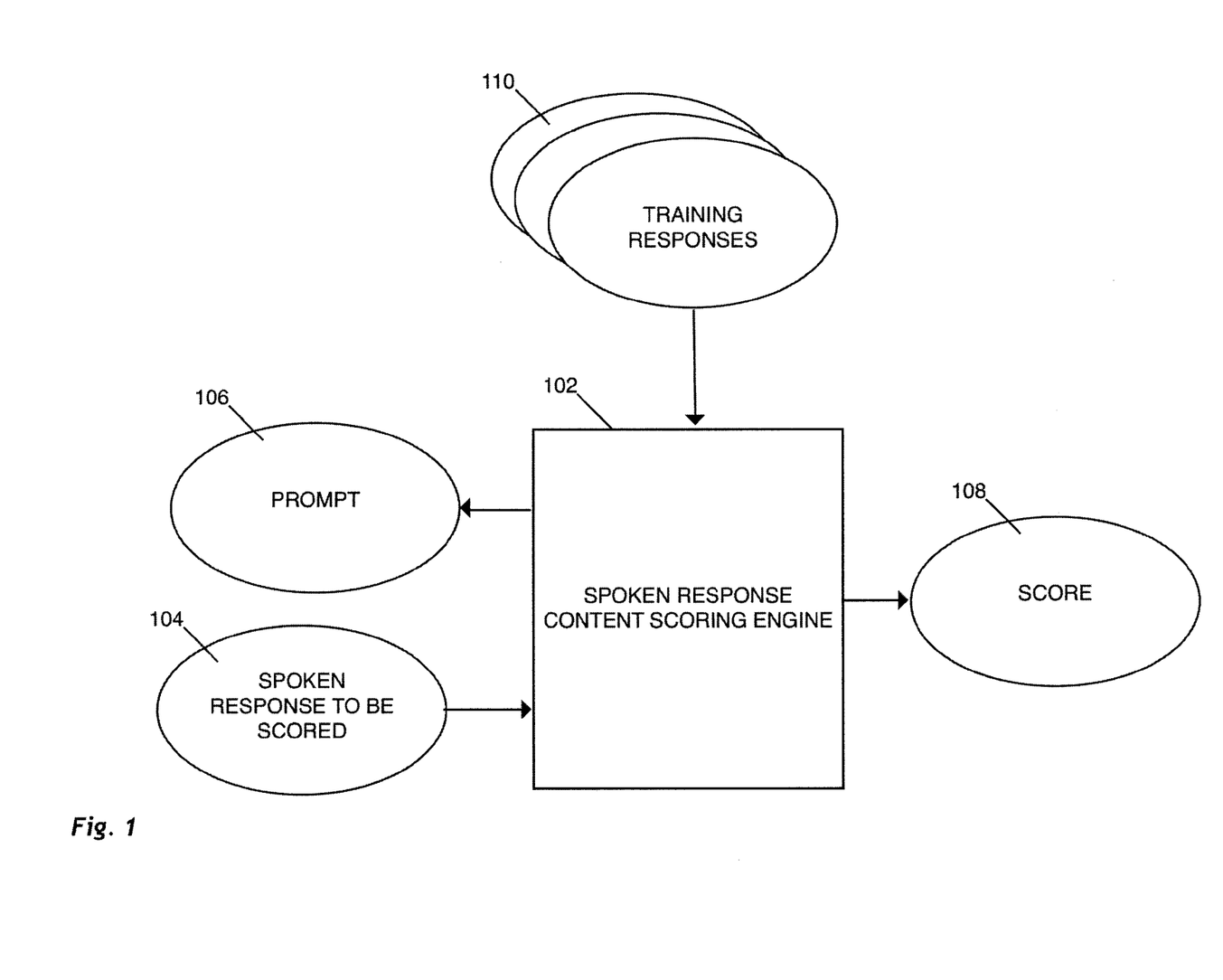
FIG. 1 depicts a computer-implemented environment for providing content scoring of spoken responses.

FIG. 1 depicts a computer-implemented environment for providing content scoring of spoken responses. A spoken response content scoring engine 102 seeks to provide a feature score that identifies a quality of the content of a spoken response 104 to a prompt 106. The spoken response content score engine 102 provides a score for the spoken response 104 using a scoring model that is generated based on a set of training responses 110 to the same prompt 106. The spoken response content scoring engine 102 identifies scores for a portion of the training responses 110 and extracts features of some or all of the training responses. The spoken response scoring engine 102 compares features of the spoken response to be scored 104 with the extracted features of the training responses 110 and the scores provided to a portion of the training responses to determine the score 108. By scoring only a portion of the training responses 110, either manually by humans or automatically, the time and cost of generating the scoring model can be greatly reduced.

Figure 2:
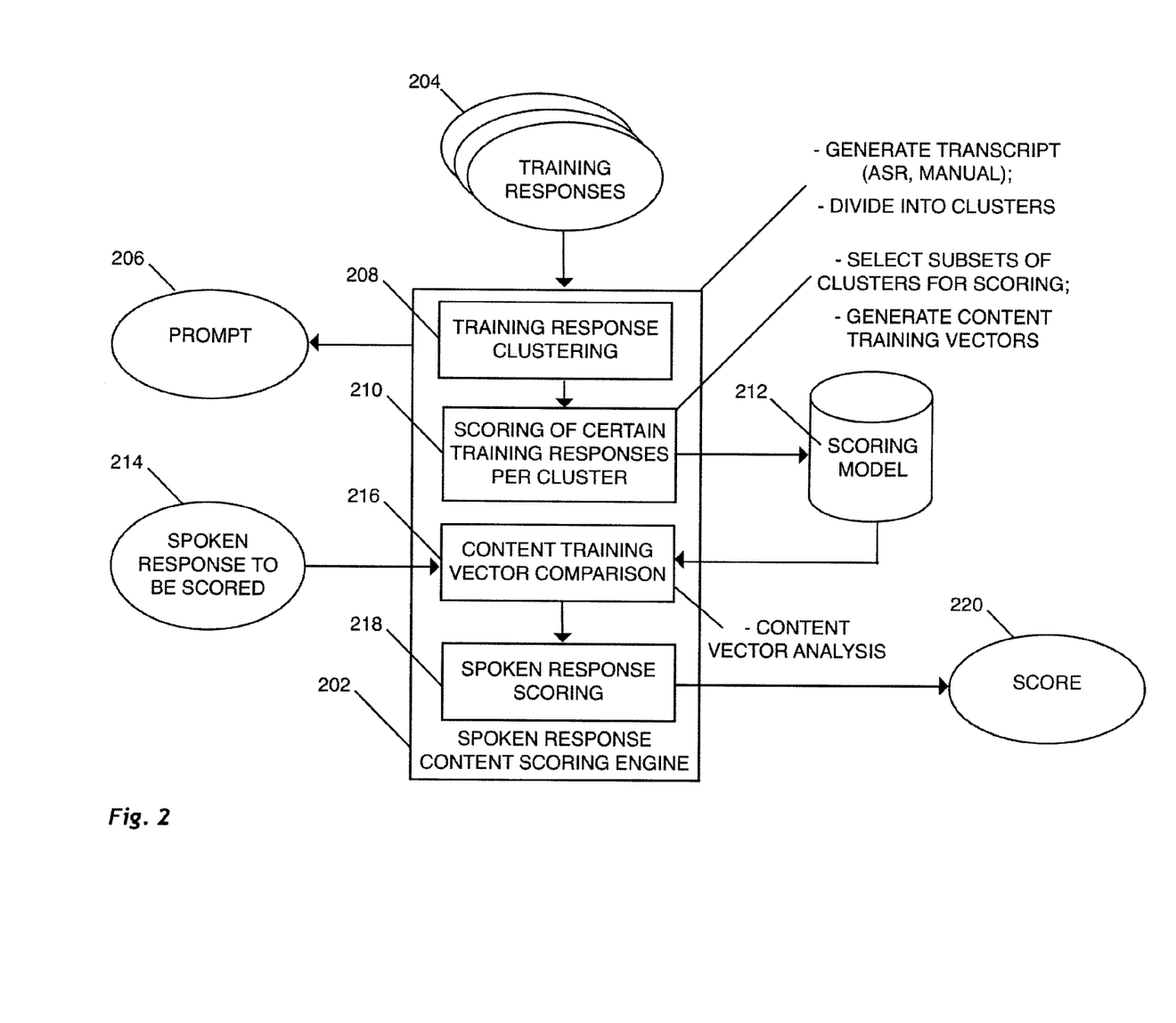
FIG. 2 is a block diagram depicting a spoken response content scoring engine generating a score using a clustering technique.

FIG. 2 is a block diagram depicting a spoken response content scoring engine generating a score using a clustering technique. A spoken response content scoring engine 202 receives a plurality of training responses 204 and uses those training response to generate a scoring model for a prompt 206. At 208, the spoken response content scoring engine 204 performs a clustering operation on the training responses 204. In one example, the clustering technique 208 includes generating a transcript for each of the plurality of training responses 204 to the prompt 206 using a speech recognizer, such as an automatic speech recognizer that includes a trained acoustic model or a human transcriber. The clustering technique 208 then divides the plurality of training responses into clusters based on the transcripts using a clustering dimension reduction technique such as latent dirichlet allocation (LDA) or latent semantic analysis (LSA).

At 210, a portion of the training responses 204 in each cluster are scored, and content training vectors are generated using the transcripts of the scored subset of training responses to generate a scoring model 212. Selection of the portion of training responses to be scored can be implemented in different manners. In one example, a random sample of m training responses in each of the n clusters is selected for scoring. In another example, m training samples closest to the center of each cluster are selected for scoring.

The selected training responses are scored manually by human scoring or automatically using machine scoring. In a manual, human scoring example, audio of each selected training response is played for a human scorer who provides a content score for that selected training response. By limiting the number of training responses that are human scored to a sample of the entirety of training responses in each cluster, substantial cost and time savings can be realized. In an automatic scoring example, each selected training response is automatically provided a content score. In one example, the automatically provided score is based on content of each selected training response. In another example, because certain non-content features of a response are closely correlated with content quality, non-content features of each selected training response are utilized to provide content scores by proxy. For example, in one embodiment, automatic content scores for each selected training response are provided based on one or more of fluency, prosody, grammar, pronunciation, and vocabulary features detected in that selected training response.

A scoring model 212 can be generated using the generated content training vectors in a variety of ways. In one example, the selected subset of training responses for each cluster is deemed representative of all training responses in that cluster. The scores for the selected training responses for a cluster are used to identify a score for that cluster. In one example, responses are scored on an integer scale of 0-4. The training responses are divided into n=5 clusters, and m training responses are selected from each cluster for scoring, resulting in a total of n*m training responses being scored. A cluster having the highest scored subset is deemed the 4 point cluster, while the remaining clusters are assigned a score based on their subset of selected training responses' scores. In another example, more than 5 clusters are generated, where the clusters are combined until n=5 clusters remain in the final scoring model. Content training vectors are then generated for each cluster based on the transcripts of all training responses assigned to that cluster. Thus, each score point is associated with a content training vector.

In another example, clustering and selection of a subset of training responses from each cluster is used to select a representative sample of the training response space. The training responses in each subset are scored, such as via manual, human scoring. Content training vectors are then generated based on the transcripts of the scored training responses. For example, a content training vector may be formed using the transcripts all the scored training responses at each score point: scored training responses that received a score of 4, a score of 3, a score of 2, a score of 1, and a score of 0. Thus, each score point is again associated with a content training vector.

Once a scoring model 212 that includes content training vectors has been generated, the scoring model 212 can be used to score spoken responses 214 to the prompt. A transcript of the spoken response to be scored 214 is generated (e.g., manually, using an automatic speech recognizer), and at 216, a content training vector comparison is performed. The content training vector comparison 216 computes a similarity metric between the spoken response to be scored 214 and the content training vectors to identify to which content training vector the spoken response to be scored 214 is most similar. When the content training vectors are associated with a cluster, the similarity metric identifies to which cluster the spoken response to be scored 214 most closely belongs. The spoken response to be scored 214 can then be assigned the score point value 220 for that cluster at 218. When the content training vectors are associated with score points, the spoken response to be scored 214 can be assigned the score point 220 for the content training vector with which it is deemed most similar at 218. The assigned content score point 220 may be a final outputted score for the spoken response 214 or it may be used as a component feature of a final score that considers other features, such as fluency, prosody, grammar, pronunciation, and vocabulary.

Figure 3:
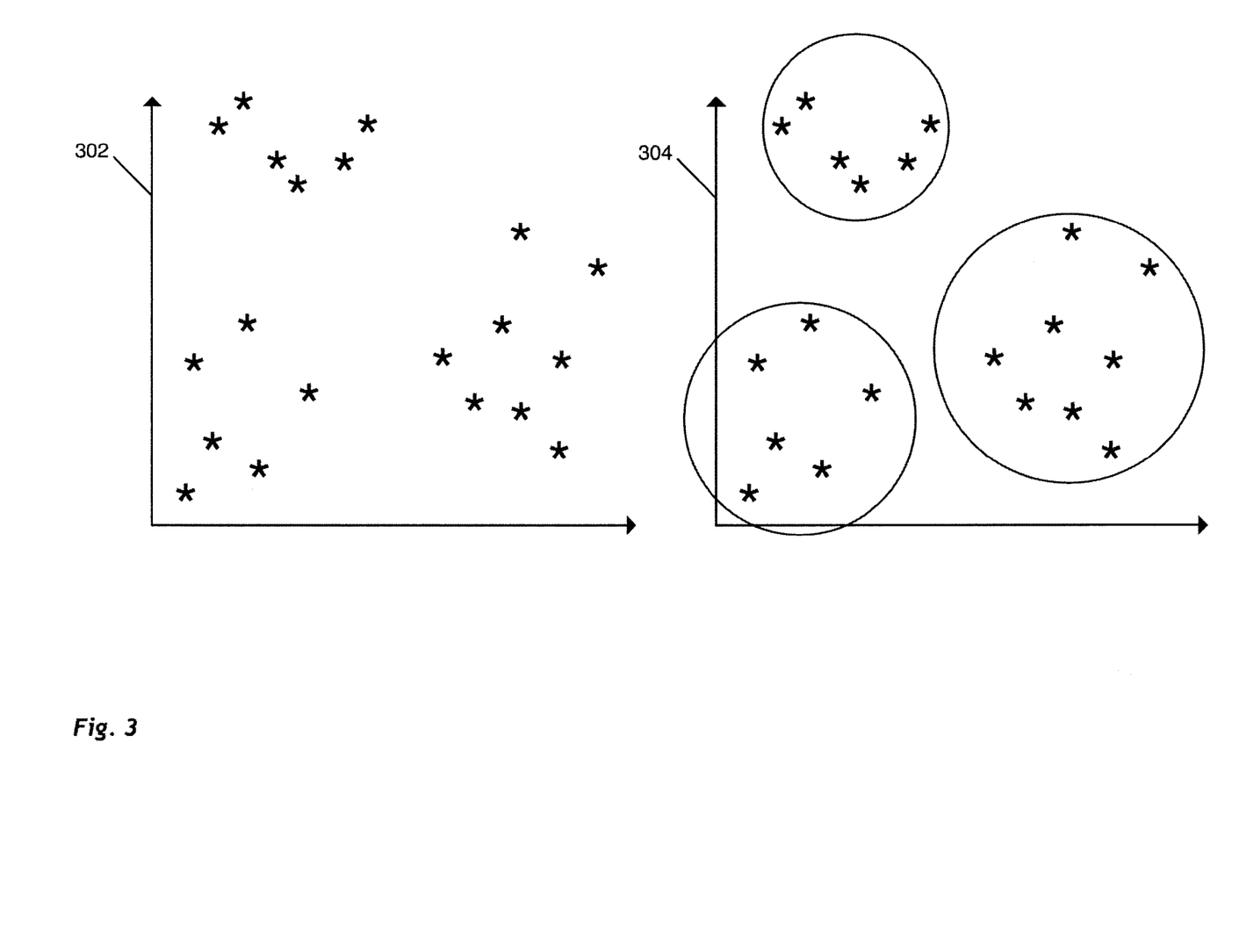
FIG. 3 is a diagram depicting dividing a plurality of training responses into clusters.

FIG. 3 is a diagram depicting dividing a plurality of training responses into clusters. At 302, the population of training responses is displayed on a graph based on two features of the responses (e.g., length of responses, vocabulary level of the responses, pronunciation level of the responses, content features of the responses). At 304, a dimension reduction operation, such as LDA or LSA is used to identify three clusters of training responses.

Figure 4:
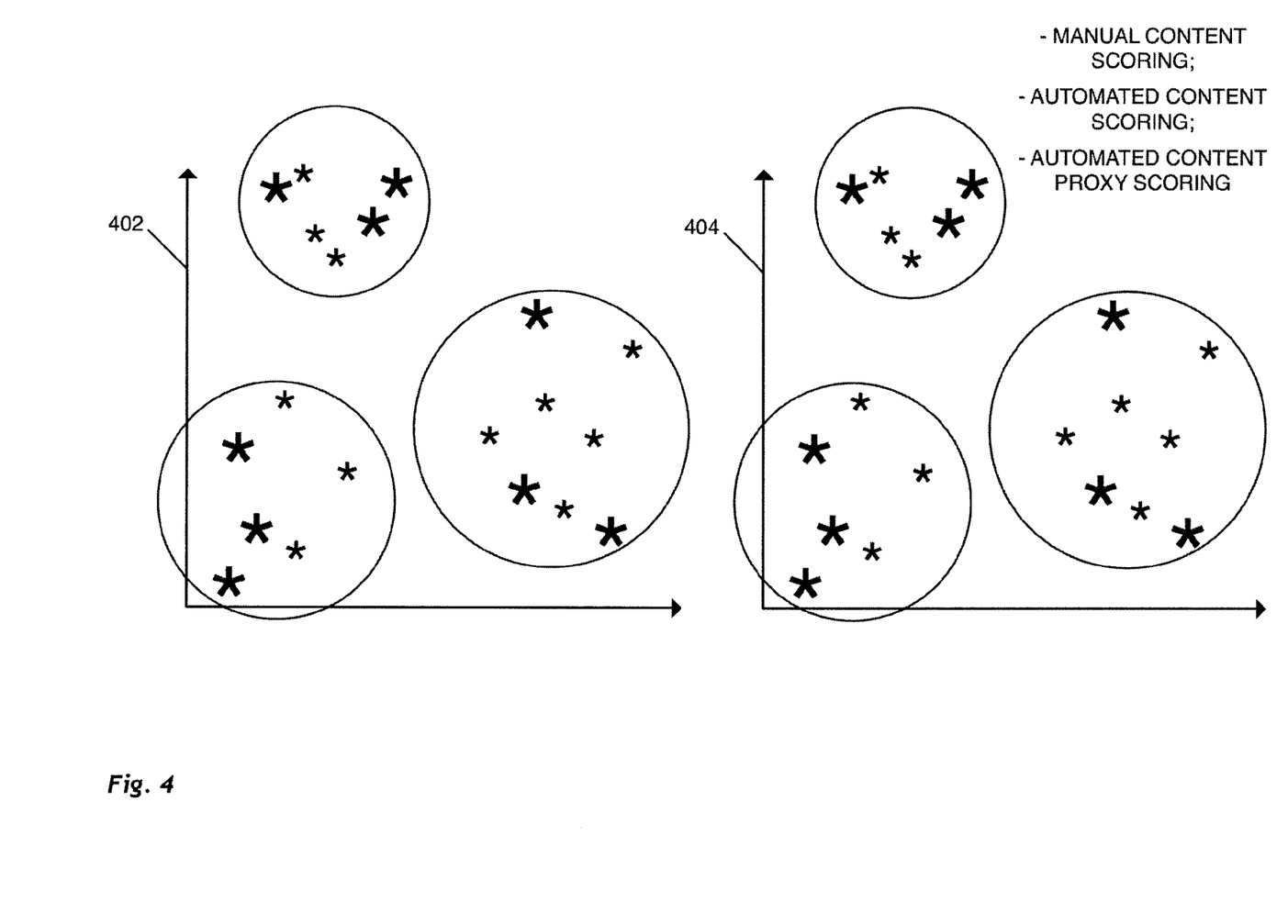
FIG. 4 is a diagram depicting selecting a subset of training responses in each cluster for scoring.

FIG. 4 is a diagram depicting selecting a subset of training responses in each cluster for scoring. At 402, a selection method is depicted where three training responses from each cluster are randomly selected for scoring (e.g., manual content scoring, automated content scoring, automated proxy content scoring based on non-content features), where the selected training responses are represented by larger stars. At 404, a second selection method is depicted where three training responses closest to the center of each cluster are selected for scoring.

Figure 5:
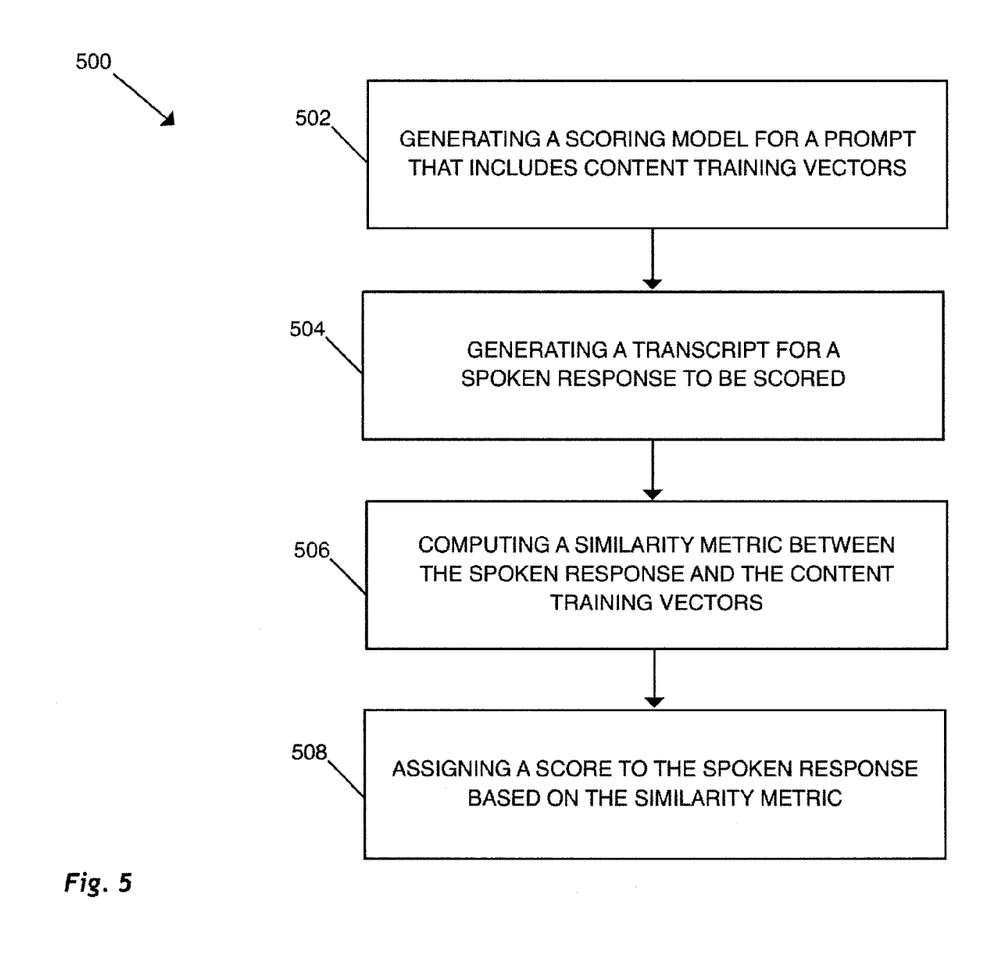
FIG. 5 is a flow diagram depicting a computer-implemented method of scoring content of a spoken response.

FIG. 5 is a flow diagram depicting a computer-implemented method of scoring content of a spoken response. A scoring model is generated for a prompt at 502, where generating the scoring model includes generating a transcript for each of a plurality of training responses to the prompt, dividing the plurality of training responses into clusters based on the transcripts of the training responses, selecting a subset of the training responses in each cluster for scoring, scoring the selected subset of training responses for each cluster, and generating content training vectors using the transcripts from the scored subset. A transcript is generated for a received spoken response to be scored at 504, and a similarity metric is computed between the spoken response to be scored and the content training vectors at 506. At 508, a score is assigned to the spoken response based on the determined similarity.

Figure 6:
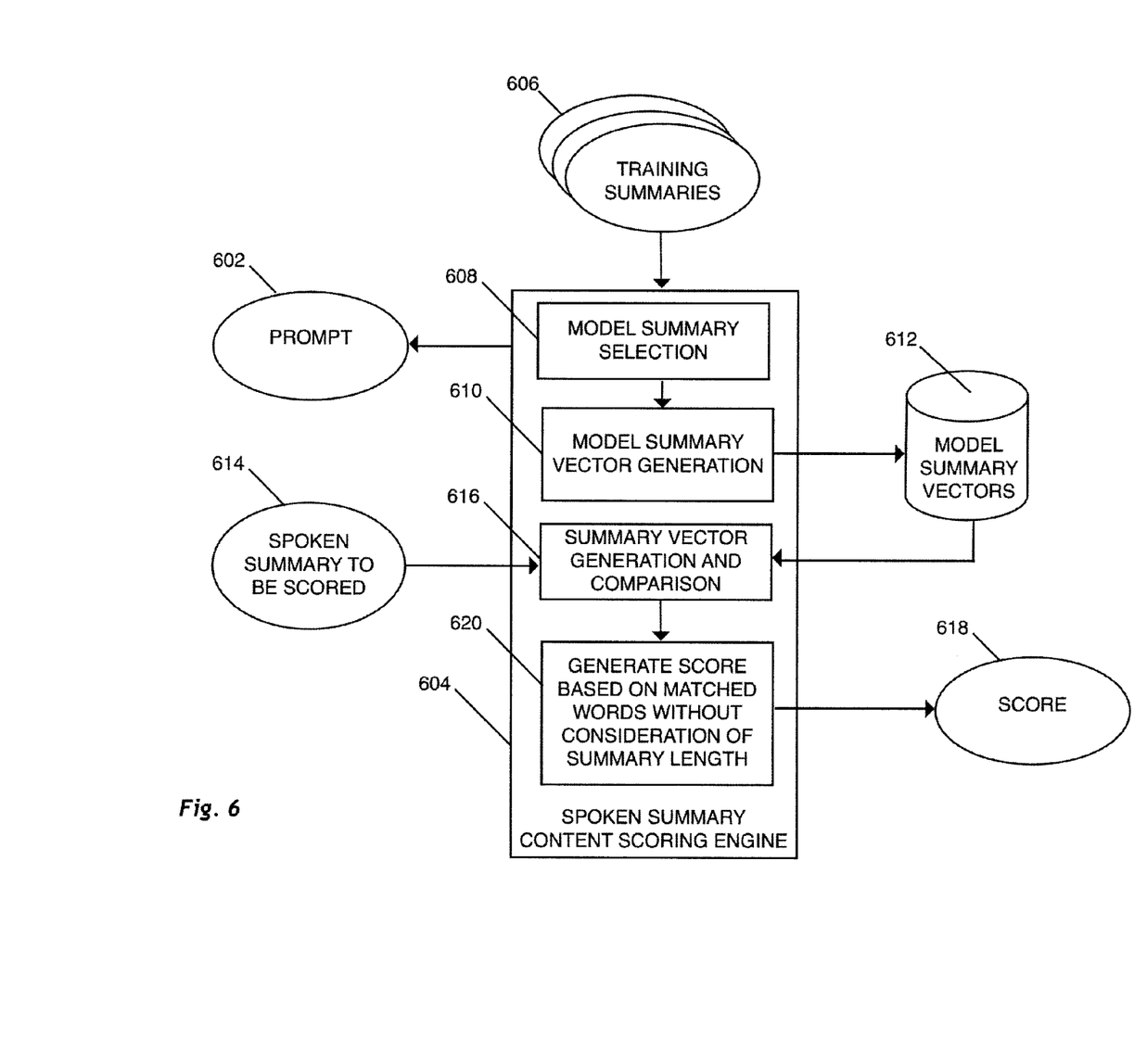
FIG. 6 is a block diagram depicting a spoken summary content scoring engine.

FIG. 6 is a block diagram depicting a spoken summary content scoring engine. A prompt 602 is provided to a respondent, and the respondent is instructed to verbally provide a summary of the content of the prompt. A spoken summary content scoring engine 604 receives a plurality of training responses 606. At 608, one or more model summaries are selected. In one example, the model summaries are selected as the highest human scored training summaries in the set of training summaries 606. For example, the human scorer may consider the amount of overlap between the prompt 602 and the training summary being scored to assess its quality. In another example, the model summaries are selected based on automatic, computer scoring of summaries. In a particular example, non-content features of training responses (e.g., fluency, prosody, grammar, pronunciation, and vocabulary) are used as a proxy for content quality scores based on the high correlation of such non-content features with response quality and the ease in automatically measuring non-content features compared to content features. At 610, a model summary word vector is generated that identifies words (or n-grams) that are present in the selected model summaries. In some instances, certain words are removed from the model summary word vector (e.g., articles, disfluencies). Further, in some instances, only the presence of a word in the model summaries is represented in the model summary word vector without storage of a count value associated with the words. The model summary word vector is stored at 612.

A spoken summary to be scored 614 is received, and a summary vector is generated that identifies words present in the spoken summary 614. In one example, a transcript of the spoken summary 614 is generated and the summary vector identifying words (or n-grams), which may or may not include counts of words in the spoken summary 614, in the spoken summary 614 is generated based on the transcript. At 616, the summary vector is compared to the model summary vector, such as using a Rouge procedure that measures word or n-gram overlap between the model summary vector from the model summary selection and the summary vector from the spoken summary to be scored 614. Based on the amount of overlap between the model summary vector and the summary vector, a content score 618 for the spoken summary 614 is generated at 620. In one example, length of the spoken summary to be scored is not considered in generating the score 618 at 620. The score 618 may be a final score stored or outputted for the spoken summary 614 or the score 618 may be a component of a broader score for the spoken summary 614.

Figure 7:
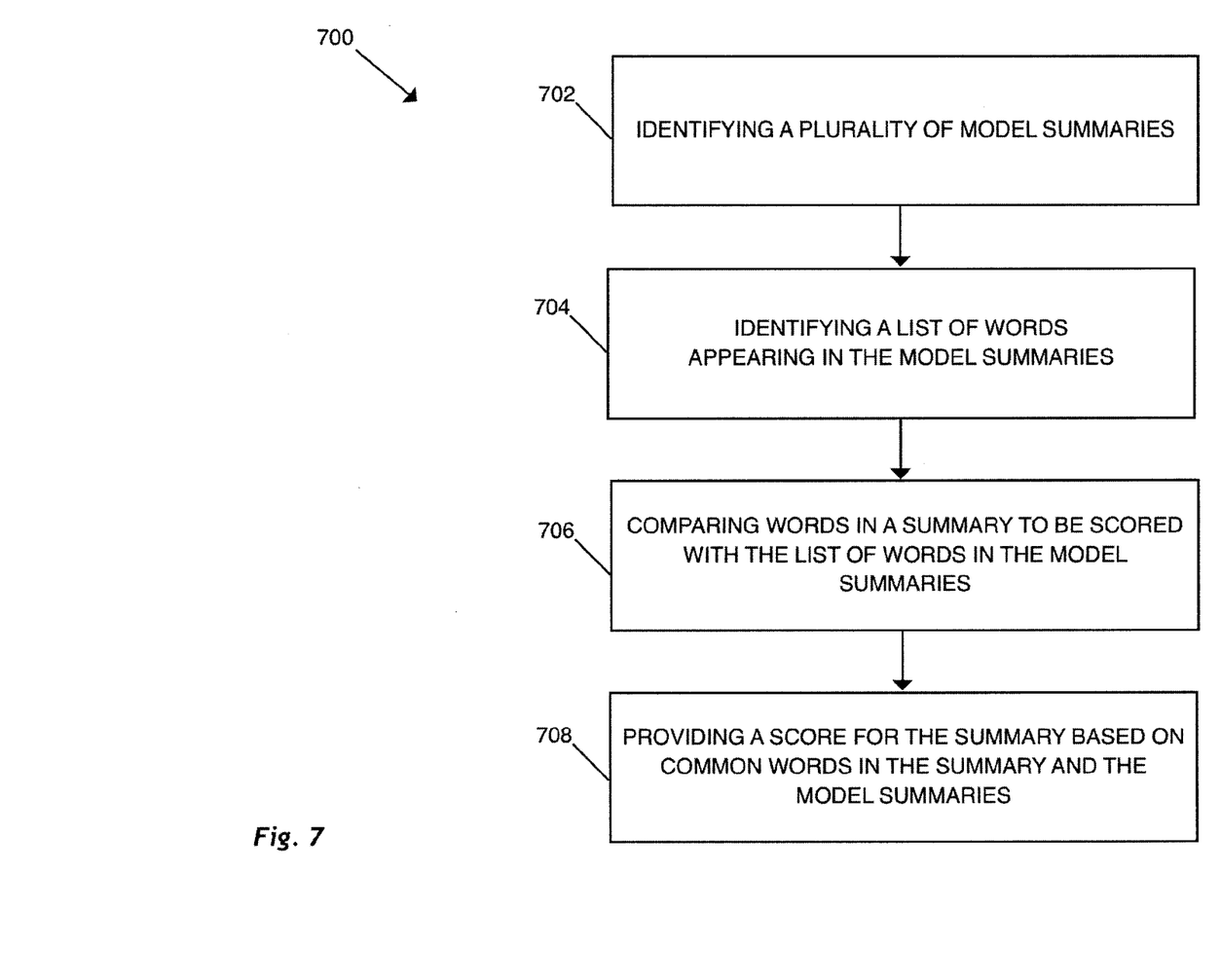
FIG. 7 is a flow diagram depicting a computer-implemented method for scoring an accuracy of a spoken summary to a prompt.

FIG. 7 is a flow diagram depicting a computer-implemented method for scoring an accuracy of a spoken summary to a prompt. At 702, a plurality of model summaries of the prompt are identified. At 704, a list of words appearing in the model summaries is identified. A summary to be scored is received, and words in the summary are compared with the list of words appearing in the model summaries at 706. At 708, a score is provided for the summary to be scored based on common words in the summary to be scored and the model summaries, where the score is not penalized for words appearing in the summary to be scored that do not appear in the list of words.

Figures 8A, 8B:
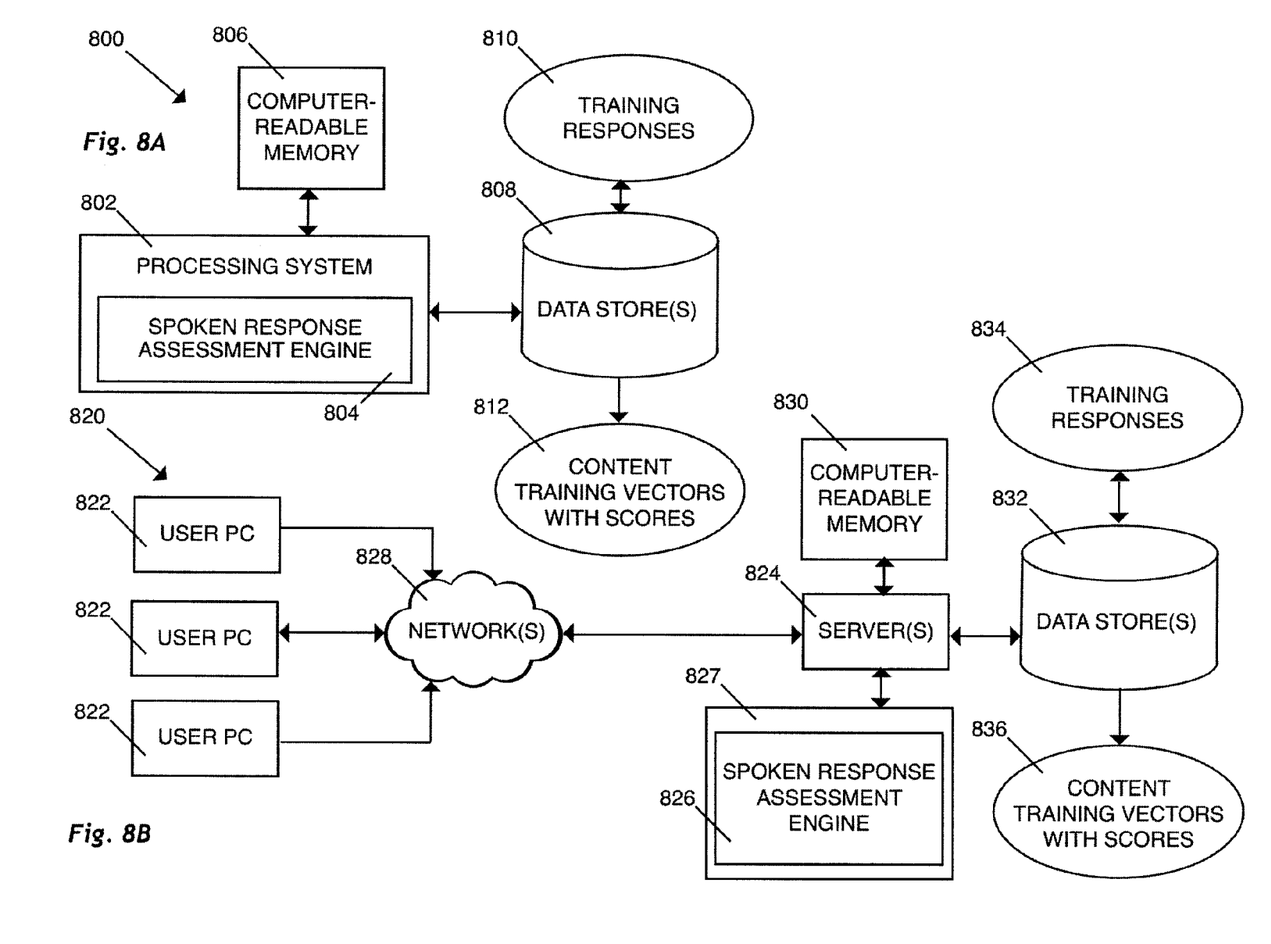
FIGS. 8A, 8B, and 8C depict example systems for use in implementing a spoken response assessment engine.
Figure 8C:
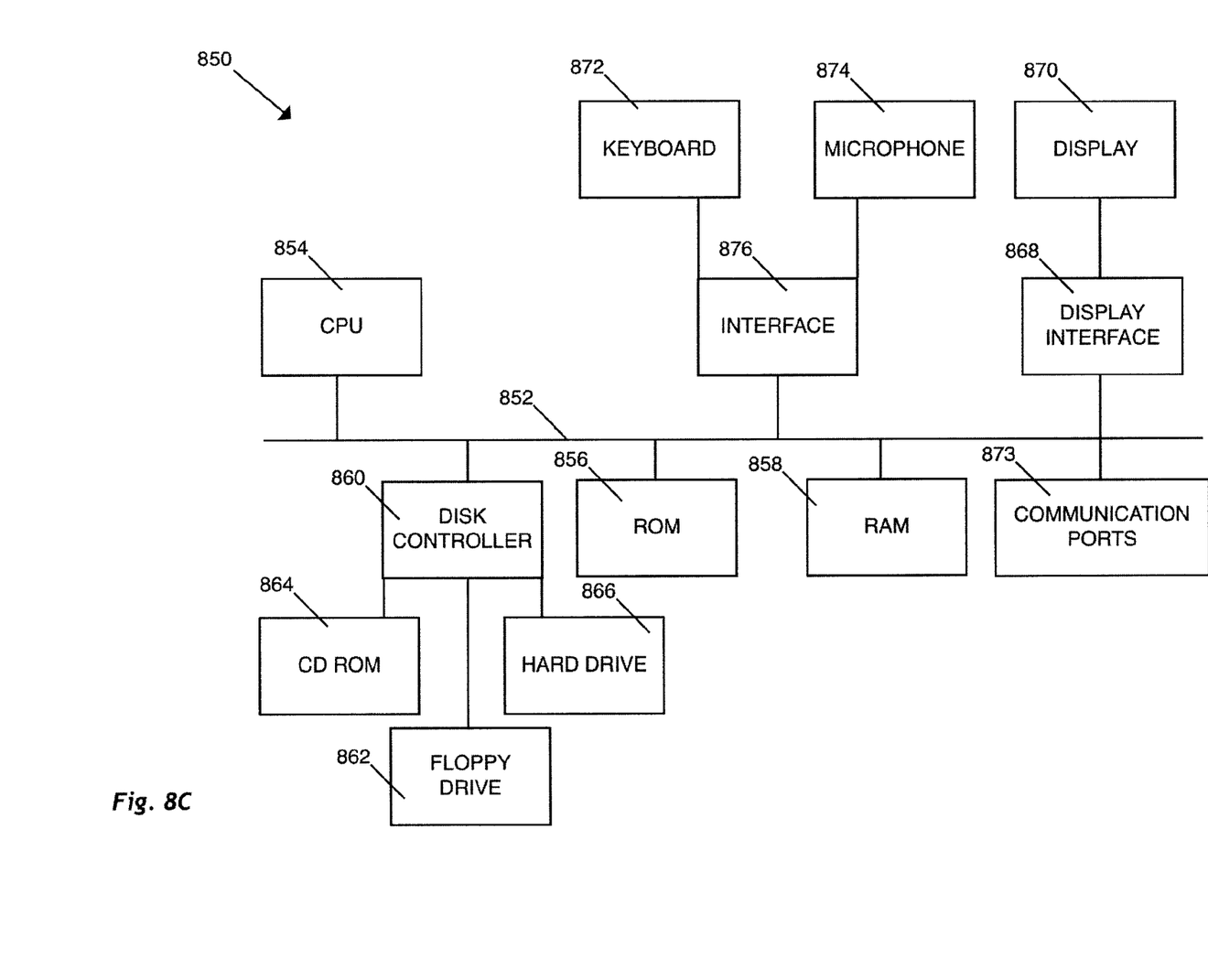

FIGS. 8A, 8B, and 8C depict example systems for use in implementing a spoken response assessment engine. For example, FIG. 8A depicts an exemplary system 800 that includes a stand alone computer architecture where a processing system 802 (e.g., one or more computer processors) includes a non-native vowel pronunciation assessment engine 804 being executed on it. The processing system 802 has access to a computer-readable memory 806 in addition to one or more data stores 808. The one or more data stores 808 may contain training responses 810 as well as content training vectors with scores 812.

FIG. 8B depicts a system 820 that includes a client server architecture. One or more user PCs 822 accesses one or more servers 824 running a spoken response assessment engine 826 on a processing system 827 via one or more networks 828. The one or more servers 824 may access a computer readable memory 830 as well as one or more data stores 832. The one or more data stores 832 may contain training responses 834 as well as content training vectors with scores 836.

FIG. 8C shows a block diagram of exemplary hardware for a standalone computer architecture 850, such as the architecture depicted in FIG. 8A, that may be used to contain and/or implement the program instructions of exemplary embodiments. A bus 852 may serve as the information highway interconnecting the other illustrated components of the hardware. A processing system 854 labeled CPU (central processing unit) (e.g., one or more computer processors), may perform calculations and logic operations required to execute a program. A computer-readable storage medium, such as read only memory (ROM) 856 and random access memory (RAM) 858, may be in communication with the processing unit 854 and may contain one or more programming instructions for performing the method of implementing a spoken response assessment engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 873.

In addition to the standard computer-type components, the hardware may also include data input devices, such as a keyboard 872, or other input device 874, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. For example, a non-native vowel pronunciation speech assessment engine may be configured for use in scoring an examinee's ability to speak a native language in addition to non-native proficiency testing. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method of scoring content of a recording of a spoken response to a prompt, comprising:
    performing automatic speech recognition on a plurality of recordings of training responses to generate a scoring model for a prompt, wherein generating the scoring model comprises:
        generating a transcript for each of a plurality of training responses to the prompt using a trained acoustic model;
        dividing the plurality of training responses into clusters based on the transcripts of the training responses based on one or more criteria of the training responses;
        selecting a subset of the training responses in each cluster for scoring;
        scoring the selected subset of training responses for each cluster; and
        generating content training vectors using the transcripts from the scored subset, wherein each content training vector is associated with a scored subset, wherein each content training vector identifies vectors of words that appear in training responses of the scored subset associated with that content training vector;
    generating, using the trained acoustic model, a transcript for a received spoken response to be scored;
    computing a similarity metric between words in the transcript of the spoken response to be scored and words in the vectors of words of the content training vectors; and
    assigning a score to the spoken response based on the determined similarity.

2. The method of claim 1, wherein generating the scoring model for the prompt further comprises:

determining a score for each cluster based on scores for the selected subset for each cluster; and wherein the content training vectors are generated based on these cluster scores and all transcripts of training responses.

3. The method of claim 1, wherein the subset of training responses for a particular cluster is selected as a subset of m responses in the particular cluster that are closest to a center of the particular cluster.

4. The method of claim 1, wherein the subset of training responses for a particular cluster is selected as a random sample of m responses in the particular cluster.

5. The method of claim 1, wherein spoken responses to the prompt are scored on a scale of 1-n, wherein the plurality of training responses are divided into n clusters.

6. The method of claim 1, wherein spoken responses to the prompt are scored on a scale of 1-n, wherein the plurality of training responses are divided into more than n clusters, wherein the more than n clusters are combined to form n clusters.

7. The method of claim 1, wherein the plurality of training responses are divided into clusters using a latent dirichlet allocation or a latent semantic analysis procedure.

8. The method of claim 1, wherein the spoken response to be scored is determined to belong to a cluster using a content vector analysis procedure.

9. The method of claim 8, wherein generating the scoring model further comprises determining a word vector for each cluster based on transcripts of training responses in each cluster.

10. The method of claim 9, further comprising generating a word vector for the spoken response, wherein the word vector for the spoken response to be scored is compared to word vectors for each vector to determine to which cluster the spoken response to be scored belongs.

11. The method of claim 1, wherein the selected subset of training responses for each cluster are scored based on the content of those training responses.

12. The method of claim 1, wherein the selected subset of training responses for each cluster are scored automatically.

13. The method of claim 1, wherein the selected subset of training responses for each cluster are scored automatically based on non-content features of those training responses, wherein the score assigned to the spoken response to be scored is a content score.

14. The method of claim 13, wherein the non-content features include one or more of fluency, prosody, grammar, pronunciation, and vocabulary.

15. The method of claim 1, wherein the transcript for each training response is generated using automatic speech recognition or manual transcription.

16. A computer-implemented system for scoring content of a spoken response to a prompt, comprising:
one or more data processors;
one or more non-transitory computer-readable mediums containing instructions for commanding the one or more data processors to execute steps that include:
performing automatic speech recognition on a plurality of recordings of training responses to generate a scoring model for a prompt, wherein generating the scoring model comprises:
generating a transcript for each of a plurality of training responses to the prompt using a trained acoustic model;
dividing the plurality of training responses into clusters based on the transcripts of the training responses based on one or more criteria of the training responses;
selecting a subset of the training responses in each cluster for scoring; scoring the selected subset of training responses for each cluster; and
generating content training vectors using the transcripts from the scored subset, wherein each content training vector is associated with a scored subset; wherein each content training vector identifies vectors of words that appear in training responses of the scored subset associated with that content training vector;
generating, using the trained acoustic model, a transcript for a received spoken response to be scored;
computing a similarity metric between words in the transcript of the spoken response to be scored and words in the vectors of words of the content training vectors; and
assigning a score to the spoken response based on the determined similarity.

17. The system of claim 16, wherein generating the scoring model for the prompt further comprises:
determining a score for each cluster based on scores for the selected subset for each cluster; and
wherein the content training vectors are generated based on these cluster scores and all transcripts of training responses.

18. The system of claim 16, wherein the subset of training responses for a particular cluster is selected as a subset of m responses in the particular cluster that are closest to a center of the particular cluster.

19. The system of claim 16, wherein the subset of training responses for a particular cluster is selected as a random sample of m responses in the particular cluster.

20. The system of claim 16, wherein spoken responses to the prompt are scored on a scale of 1-n, wherein the plurality of training responses are divided into n clusters.

21. The system of claim 16, wherein spoken responses to the prompt are scored on a scale of 1-n, wherein the plurality of training responses are divided into more than n clusters, wherein the more than n clusters are combined to form n clusters.

22. The system of claim 16, wherein the plurality of training responses are divided into clusters using a latent dirichlet allocation or a latent semantic analysis procedure.

23. The system of claim 16, wherein the selected subset of training responses for each cluster are scored manually by humans.

24. The system of claim 16, wherein:
the spoken response to be scored is determined to belong to a cluster using a content vector analysis procedure;
the generating of the scoring model further comprises determining a word vector for each cluster based on transcripts of training responses in each cluster; and
the steps further include generating a word vector for the spoken response to be scored, wherein the word vector for the spoken response to be scored is compared to word vectors for each vector to determine to which cluster the spoken response to be scored belongs.

* * * * *